United States Patent [19]

Moriya et al.

[11] 4,387,912

[45] Jun. 14, 1983

[54] SEATBELT SYSTEM

[75] Inventors: Shigeru Moriya; Akio Yoshida, both of Toyota; Koichi Tanaka; Yuji Nishimura, both of Nagoya, all of Japan

[73] Assignees: Toyota Jidosha Kogyo Kabushiki Kaisha; Kabushiki-Kaisha Tokai-Rika-Denki-Seisakusho, both of Aichi, Japan

[21] Appl. No.: 308,939

[22] Filed: Oct. 5, 1981

[30] Foreign Application Priority Data

Oct. 14, 1980 [JP] Japan .......................... 55-145863[U]

[51] Int. Cl.³ .............................................. B60R 21/10

[52] U.S. Cl. .................................... 280/804; 297/469

[58] Field of Search ............... 280/802, 803, 804, 806, 280/808; 297/469

[56] References Cited

U.S. PATENT DOCUMENTS 3,995,884 12/1976 Bauer et al. ........................ 280/804

4,268,068 5/1981 Suzuki et al. ....................... 280/804

4,284,294 8/1981 Takada ............................... 280/804

FOREIGN PATENT DOCUMENTS 55-39827 3/1980 Japan .................................. 280/804

*Primary Examiner*—Joseph F. Peters, Jr.

*Assistant Examiner*—Ross Weaver

*Attorney, Agent, or Firm*—Parkhurst & Oliff

[57] ABSTRACT

A rotatable member rotatable by the movement of one of a lap webbing and a shoulder webbing and another rotatable member for moving an engageable portion of the other webbing are provided on the side of a vehicle body and on the side of a door, whereby these rotatable members are engaged with or disengaged from each other in accordance with the closing or opening of the door, so that one of the rotatable members being in contact with each other can impart rotation.

Only one driving source can be provided for moving the webbings.

14 Claims, 6 Drawing Figures

1
1
2
3
4
5
6
7
8
8A
8B
9
10
13A
13B
14
15
16
19
19
20
26
II
II
III
III

SEATBELT SYSTEM

BACKGROUND OF THE INVENTION

1. Field of the Invention

This invention relates to seatbelt systems, and particularly to a seatbelt system, in which webbings for restraining an occupant are supported by a door.

2. Description of the Prior Art

There has been proposed a passive seatbelt system, in which one end of one of webbings for restraining an occupant is secured to a door, whereby webbings are caused to approach or leave a seat of a vehicle in accordance with the opening or closing action of the door, so that the webbings can be automatically fastened about or released from the occupant.

The passive seatbelt system of the type described is provided therein with an outer webbing, one end of which is engaged with the inner surface of the door and the other end of which is engaged with a roof side. The intermediate portion of this outer webbing is turned back at a through-ring secured to the forward end of an inner webbing withdrawn from a retractor. A portion of the outer webbing closer to the door than this turned-back position is used as a lap webbing and a portion of the outer webbing on the side of the roof side is used as a shoulder webbing. When the door is open, the engaged portion of the lap webbing is adapted to be positioned at an upper forward portion of the inner surface of the door, and the engaged portion of the shoulder webbing is adapted to be positioned at the forward end portion of the roof side. Thus, a space, in which the occupant can move his legs, can be satisfactorily secured. When the door is closed, for example, the engaged portion of the lap webbing is automatically positioned at the lower rear portion of the inner surface of the door and the engaged portion of the shoulder webbing is automatically positioned at the rear end portion of the roof side, respectively, thereby enabling to display a satisfactory occupant restraining performance in an emergency of the vehicle.

However, since the door is of such an arrangement as to be openable or closable by way of hinges, it is necessary to provide driving sources such as motors for moving the engaged portion of the lap webbing on the door and the engaged portion of the shoulder webbing at the roof side of the vehicle body, on the door and the vehicle body separately of each other.

SUMMARY OF THE INVENTION

The present invention has as its object the provision of a seatbelt system, in which a single driving source can move the engaged portion of the shoulder webbing at the roof side of the vehicle and the engaged portion of the lap webbing on the door.

In the seatbelt system according to the present invention, a rotary member rotatable in accordance with the movement of either one of the engaged portions of the lap webbing and the shoulder webbings and another rotary member for moving the engaged portion of the other webbing are provided on the vehicle body and the door, respectively, these rotary members are made capable of approaching or leaving each other in accordance with the opening or closing of the door, and, when the door is closed, one of the rotary members comes into contact with the other to transmit the rotation.

DESCRIPTION OF THE PREFERRED EMBODIMENTS

Figure 1:
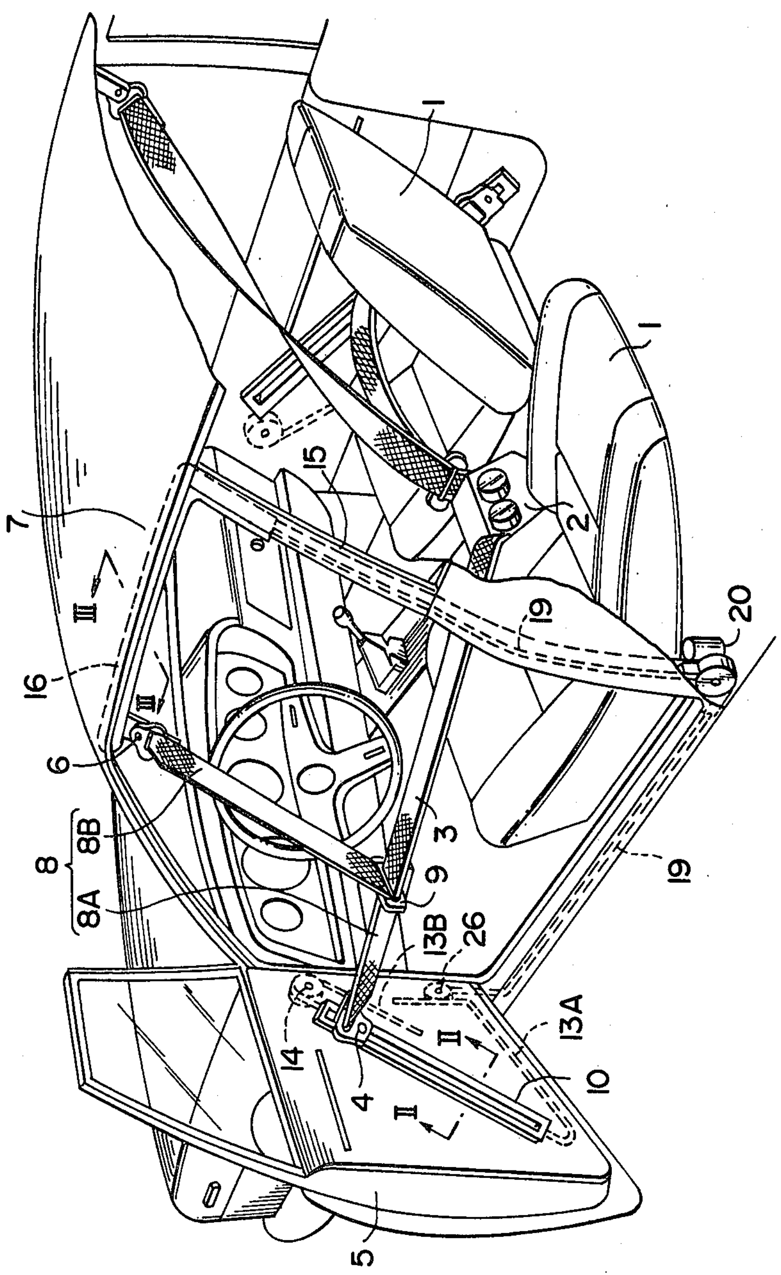
FIG. 1 is a perspective view showing one embodiment of the seatbelt system according to the present invention with one of the vehicle doors being open.

Referring to FIG. 1, provided between separate type seats 1 is a retractor 2, from which an inner webbing 3 is withdrawn. The retractor 2 is adapted to wind the inner webbing 3 up by an urging force thereof and incorporates therein an inertia lock mechanism adapted to abruptly stop the windout of the inner webbing 3 in an emergency of the vehicle.

An outer webbing 8 is provided which is engaged at one end thereof with the inner surface of a door 5 through a lap anchor 4 and engaged at the other end thereof with a roof side 7 through a shoulder anchor 6. The intermediate portion of this outer webbing 8 extends through a through-ring 9 secured to the forward end of the inner webbing 3 and is turned back thereat. In this outer webbing 8 divided by the turned-back portion as a border, a portion on the lap anchor 4 is used as a lap webbing 8A and a portion on the shoulder anchor 6 as the shoulder webbing 8B.

Figure 2:
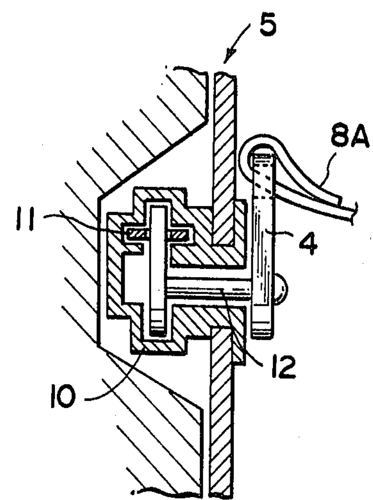
FIG. 2 is a sectional view taken along the line II—II in FIG. 1.

The lap webbing 8A is provided at the forward end thereof with the lap anchor 4. This lap anchor 4 is engaged with the inner surface of the door 5 and adapted to slide on a lap rail 10 secured to the door 5 from the upper forward portion to the lower rear portion of the latter. As shown in FIG. 2 which is a sectional view taken along the line II—II in FIG. 1, the lap rail 10 incorporates therein a flexible tape 11, in which a plurality of sprocket holes are provided in a row at regular intervals in the longitudinal direction thereof. This flexible tape 11 is made of a material for imparting a tensile force as well as a compressive force. The lap anchor 4 is rotatably mounted on a sliding member 12 in the lap rail 10, and this sliding member 12 is meshed with one or more of the sprocket holes of the aforesaid flexible tape 11. One end portion of the flexible tape 11 extends through a track 13A starting from the rear end portion (as viewed in the longitudinal direction of the vehicle) of the lap rail 10 at the lower rear portion of the door 5, passing through the bottom portion of the door 5 and further ending at the side portion of the door, which is connected to the vehicle body by means of hinges. The other portion of the flexible tape 11 extends through a track 13B turned back at the forward end portion (as viewed in the longitudinal direction of the vehicle) of the lap rail 10 and then formed substantially in parallel to the lap rail 10. The movement of this flexible tape 11 through the lap rail 10, the tracks 13A and 13B causes the lap anchor 4 to move on the lap rail 10. In addition, in the forward end portion (as viewed in the longitudinal direction of the vehicle) of the lap rail 10, there is provided a sprocket wheel 14 for being meshed with the sprocket holes of the flexible tape 11 and having means such as a constant tension spring for urging the lap anchor 4 in the direction of positioning to the forward end portion (as viewed in the longitudinal direction of the vehicle) of the lap rail 10. Furthermore, a lock mechanism, not shown, is provided at the end portion of the lap rail 10 disposed at the lower rear portion of the door 5. This lock mechanism is adapted to abruptly lock the lap anchor 4 positioned thereat in an emergency of the vehicle.

Figure 3:
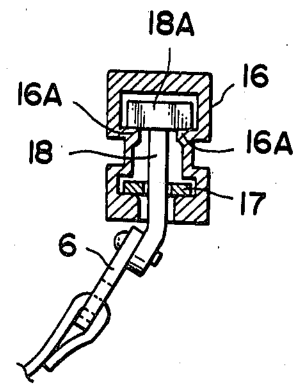
FIG. 3 is a sectional view taken along the line III—III in FIG. 1.
Figure 4:
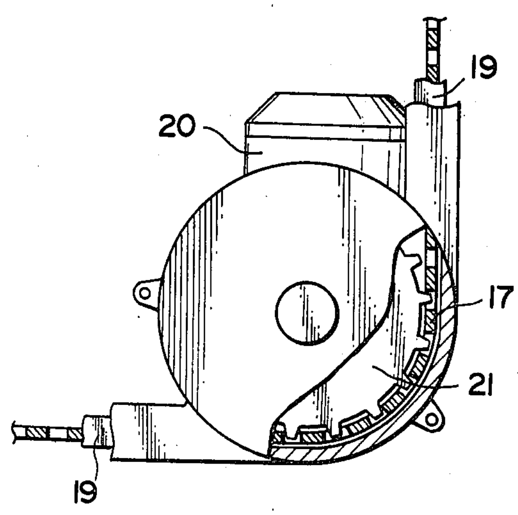
FIG. 4 is a partly broken away view showing the door and a portion therearound of the motor, which is the driving source provided in the vehicle body.
Figure 5:
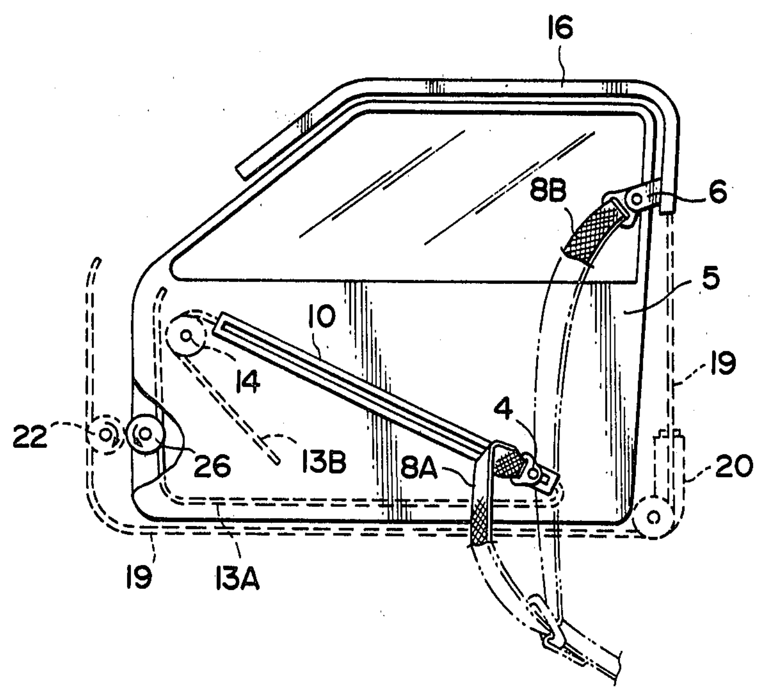
FIG. 5 is a view showing the door and a portion therearound as viewed from inside of the vehicle.
Figure 6:
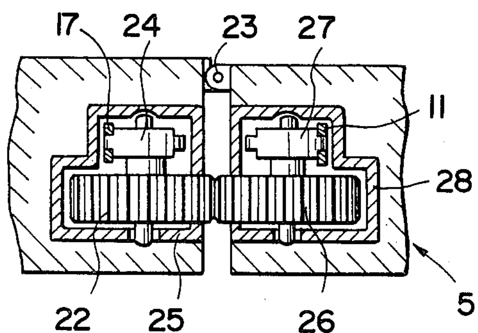
FIG. 6 is a sectional view showing the hinged portion between the door and the vehicle body.

The shoulder anchor 8B is engaged with the roof side 7 through the shoulder anchor 6, which is adapted to slide on a shoulder rail 16 formed in a shape curved from the forward portion of the roof side 7 to the center pillar 15. As shown in FIG. 3 which is a sectional view taken along the line III—III in FIG. 1, the shoulder rail 16 incorporates therein a flexible tape 17, in which a plurality of sprocket holes are provided in a row at regular intervals. The shoulder anchor 6 is rotatably secured to a sliding member 18 in the shoulder rail 16, and this sliding member 18 extends through one or more sprocket holes of the flexible tape 17. Additionally, the sliding member 18 is engaged at the head 18A with a projection 16A on the inner wall surface of the shoulder rail 16 for example so that it will not fall off the shoulder rail 16 under a high tension of the shoulder webbing 8B. The aforesaid flexible tape 17 extends through a track 19 starting from the end portion of the shoulder rail 16 and ending at the bottom portion of the vehicle. The movement of this flexible tape 17 through the shoulder rail 16 and the track 19 causes the shoulder anchor 6 to move on the shoulder rail 16. A motor 20 is provided in a curved portion of the track 19 which extends along the center pillar 15 and curved at the bottom portion of the vehicle body. This motor 20, as shown in FIG. 4, is adapted to rotate the sprocket wheel 21 through a worm gear, not shown. This sprocket wheel 21 is meshed with the sprocket holes of the flexible tape 17. Consequently, the motor 20 becomes a driving source for moving the flexible tape 17 by the driving force thereof, whereby the movement of the flexible tape 17 causes the shoulder anchor 6 to move on the shoulder rail 16. As shown in FIG. 5, the track 19, along which the flexible tape 17 moves, is so constructed that it extends from the center pillar 15, through the bottom portion of the vehicle body and is erected along the side portion of the front pillar, which is connected to the door by means of hinges. A gear wheel 22 being rotatable by the movement of the flexible tape 17 is provided at the lower end portion of the side portion of the front pillar on this track 19. This gear wheel 22, as shown in FIG. 6, is partially exposed from the side portion of the front pillar, which is connected to the door 5 by means of the hinges 23 and coaxially provided with a sprocket wheel 24 being meshed with a sprocket holes of the flexible tape 17. Additionally, the gear wheel 22 and the sprocket wheel 24 are incorporated in a casing 25 which supports the rotary shafts of the both wheels. Furthermore, a gear wheel 26 adapted to be meshed with the aforesaid gear wheel 22, when the door 5 is closed, is provided in the door 5. The gear wheel 26 is secured coaxially with a sprocket wheel 27, which is meshed with the sprocket holes of the flexible tape 11 in the track 13A of the door 5. Consequently, the movement of the flexible tape 17 in the track 19 on the vehicle body causes the gear wheels 22 and 26 to rotate, whereby the flexible tape 11 in the track 13A of the door 5 is moved.

The gear wheel 26 and the sprocket wheel 27 are incorporated in a casing 28 supporting rotary shafts of the both wheels. And, when the door 5 is opened, the gear wheel 26 together with the door 5 performs a circular arcuate motion about the hinges 23 connected to the vehicle body so as to be disengaged from the gear wheel 22 on the vehicle body. Furthermore, a lock mechanism, not shown, is provided at the end portion of the shoulder rail 16 curvedly extending to the center pillar. This lock mechanism is adapted to abruptly lock the shoulder anchor 13 positioned at this place in an emergency of the vehicle.

Description will now to be given of an embodiment with the abovedescribed arrangement.

If the door 5 is opened when an occupant enters the vehicle, then the shoulder webbing 8B is positioned at the forward end (as viewed in the longitudinal direction of the vehicle) of the shoulder rail 16 on the roof side 7 through the shoulder anchor 6 as shown in the driver's seat in FIG. 1. Then, the lap webbing 8A is positioned at the forward end (as viewed in the longitudinal direction of the vehicle) of the lap rail 10 on the surface of the door 5. Particularly, the lap anchor 4 is positioned at the forward end (as viewed in the longitudinal direction of the vehicle) of the lap rail 10 by means of the sprocket wheel 14 provided thereon with a constant tension spring. With the abovedescribed arrangement, the inner webbing 3 and the outer webbing 8 are positioned at forward positions in the vehicle, so that an ample space can be formed between the seat and the webbings.

When the door 5 is closed after the occupant is seated, a switch for example, not shown, is closed to drive the motor 20. The sprocket wheel 21 rotated by the driving force of the motor 20 moves the flexible tape 17. The sliding member 18 extending through the sprocket hole of the flexible tape 17 in the shoulder rail 16 and the shoulder anchor 6 are moved to the curved portion of the shoulder rail 16 on the side of the center pillar 16. At this time, the moving flexible tape 17 rotates the gear wheel 22 provided coaxially with the sprocket wheel 24 being meshed with the latter. Rotation of the gear wheel 22 is imparted to the gear wheel 26 which is to be meshed with the former when the door 5 is closed to thereby rotate the sprocket wheel 27 provided coaxially with this gear wheel 26 and meshed with the flexible tape 11. The flexible tape 11 moves in the tracks 13A and 13B in accordance with the rotation of the aforesaid sprocket wheel 17. The sliding member 12 extending through the sprocket wheel of the flexible tape 11 in the lap rail 10 and the lap anchor 4 move along the lap rail 10 to the lower rear portion of the inner surface of the door 5 in accordance with the rotation of the sprocket wheel 17. At this time, the inner webbing 3 is wound into the retractor 2, whereby the lap webbing 8A and the shoulder webbing 8B are positioned as indicated by the assistant driver's seat in FIG. 1. Thus, the webbings 8A and 8B are automatically fastened about the occupant.

When the vehicle has fallen into an emergency of a collision, the inertia lock mechanism incorporated in the retractor 2 can positively stop the windout of the lap webbing 8A, and the lap anchor 4 and the shoulder anchor 6 can be positively locked by means of the lock mechanisms provided at the lower rear end of the lap rail 10 and on the side of the center pillar 15, not shown, respectively. As described above, the occupant is positively restrained by the webbings 8A and 8B to avoid colliding against dangerous protrusions, thereby enabling to secure the safety of the occupant.

If door is opened when the occupant leaves the vehicle, then a switch for example, not shown is closed to drive the motor 20. The motor 20 rotates in a direction opposite to the direction in the case of the door 5 being opened when the occupant enters the vehicle. The sprocket wheel 24 operationally associated with the rotation moves the flexible tape 17 to thereby position the sliding member 18 in the shoulder rail 16 to the forward end (as viewed in the longitudinal direction of the vehicle) of the latter. At the same time as this, the gear wheel 26 secured to the door 5 is disengaged from the gear wheel 22 secured to the vehicle body due to the opening of the door 5. Because of this, the flexible tape 11 on the door's side is not interlocked with the flexible tape 17 on the side of the vehicle body through the gear wheels 22 and 26. The lap anchor 4 is positioned at the forward end (as viewed in the longitudinal direction of the vehicle) of the lap rail 10 by the rotation of the sprocket wheel 14 having the constant tension spring secured to the forward end (as viewed in the longitudinal direction of the vehicle) of the lap rail 10. With the abovedescribed arrangement, the lap webbing 8A and the shoulder webbing 8B are positioned as shown in FIG. 1, a space for permitting the occupant to enter the vehicle is formed between the webbings 8A, 8B and the seat 1, and the same state as in the case of the door being opened when the occupant enters the vehicle can be brought about.

In the seatbelt system with the abovedescribed arrangement, the gear wheel 22 being rotatable by the movement of the shoulder anchor 6 of the shoulder webbing 8B, which is by the driving force of the motor 20 on the side of the vehicle body and the gear wheel 26 for moving the lap anchor of the lap webbing 8A are provided on the side of the vehicle body and on the side of the door 5, respectively, the gear wheels 22 and 26 can be engaged with or disengaged from each other in accordance with the closing or opening of the door 5 and, when the door 5 is closed, the gear wheel 22 being meshed with the gear wheel 26 is adapted to impart the rotation to the gear wheel 26, so that the motor 20 provided only on the side of the vehicle body can move the lap anchor of the lap webbing 8A on the side of the door 5.

This arrangement can eliminate the necessity of provision of a driving source or the like on the side of the door 5 for moving the lap anchor 4 of the lap webbing 8A as in the prior art, which would make the construction complicated. Furthermore, when the motor is secured to the door 5, it becomes necessary to dispose a power supply wiring leading to the motor from the side of the vehicle body through the hinge portion between the door 5 and the vehicle body. Consequently, there is a fear of the breakage of the power supply wiring due to the frequent flexing thereof through the opening or closing of the door 5. However, in the abovedescribed embodiment, such a disadvantage can be removed as described above.

In the abovedescribed embodiment, there have been used the gears 22 and 26, respectively, as a first rotatable member rotatable by the movement of the shoulder anchor 6 which is moved by the motor 20 or the like, and a second rotatable member for moving the lap anchor 4, however, these gear wheels can be replaced with rollers and the like for imparting the rotation therebetween through the friction.

Additionally, in the abovedescribed embodiment, the driving source such as the motor 20 is secured to the vehicle body on the side of the vehicle body, however, the position of mounting should not necessary be limited to the side of the vehicle body, but on the contrary, the driving source can be mounted on the side of the door 5 and operationally associated with the movement of the lap anchor 4 to thereby move the shoulder anchor 6.

What is claimed is:

1. A seatbelt system comprising:

a first guide rail provided on a roof side;

a first sliding member slidably secured to said first guide rail and connected thereto with one end of a shoulder webbing;

a second guide rail provided on the inner side surface of a door;

a second sliding member slidably secured to said second guide rail and connected thereto with one end of a lap webbing;

a first rotatable member secured to a vehicle body and rotatable in operational association with the movement of said first sliding member;

a second rotatable member rotatable in operational association with said second sliding member and provided on the door so as to engage said first rotatable member when the door is closed whereby movement of said first sliding member requires movement of said second sliding member; and driving means for moving said first and second sliding members.

2. A seatbelt system as set forth in claim 1, wherein said driving means comprises:

a first flexible tape provided in a manner to be movable on said first guide rail, secured at the intermediate portion thereof with said first sliding member and contacting said first rotatable member;

a second flexible tape provided in a manner to be movable on said second guide rail, secured at the intermediate portion thereof with said second sliding member and contacting said second rotatable member; and a driving source for moving said first and second tapes.

3. A seatbelt system as set forth in claim 2, wherein said first and second tapes are each formed with a plurality of sprocket wheels.

4. A seatbelt system as set forth in any one of claims 1 through 3, including a retractor for winding up an inner webbing.

5. A seatbelt system as set forth in claim 4, wherein said retractor is provided therein with an inertia lock mechanism for stopping the windout of said inner webbing in an emergency of the vehicle.

6. A seatbelt system as set forth in any one of claims 1 through 3, wherein said second guide rail is secured to the inner side surface of the door from the upper forward portion to the lower rear portion thereof.

7. A seatbelt system as set forth in claim 2, wherein said seatbelt system is used for the front seats.

8. A seatbelt system as set forth in claim 7, wherein said first rotatable member is disposed at a portion adjacent a hinge portion for mounting the door.

9. A seatbelt system as set forth in claim 8, wherein said first flexible tape passes through a center pillar and a floor side and reaches said first rotatable member disposed at the portion adjacent the hinge portion for mounting the door.

10. A seatbelt system as set forth in claims 8 or 9, wherein said second rotatable member is provided at a portion adjacent the hinge portion for mounting the door.

11. A seatbelt system as set forth in claims 1, 2, 3, 7, 8 or 9, including a lock mechanism for abruptly locking said first sliding member in an emergency of the vehicle.

12. A seatbelt system as set forth in claim 4, including a lock mechanism for abruptly locking said first sliding member in an emergency of the vehicle.

13. A seatbelt system as set forth in claim 5, including a lock mechanism for abruptly locking said first sliding member in an emergency of the vehicle.

14. A seatbelt system as set forth in claim 6, including a lock mechanism for abruptly looking said first sliding member in an emergency of the vehicle.

* * * * *